United States Patent
Sato

(10) Patent No.: US 6,937,935 B2
(45) Date of Patent: Aug. 30, 2005

(54) CAR NAVIGATION SYSTEM AND CAR NAVIGATION CONTROL METHOD

(75) Inventor: Hiroyuki Sato, Zama (JP)

(73) Assignee: Xanavi Informatics Corporation, Zama (JP)

( * ) Notice: Subject to any disclaimer, the term of this patent is extended or adjusted under 35 U.S.C. 154(b) by 0 days.

(21) Appl. No.: 10/487,418

(22) PCT Filed: Feb. 16, 2002

(86) PCT No.: PCT/JP02/08310

§ 371 (c)(1),
(2), (4) Date: Feb. 23, 2004

(87) PCT Pub. No.: WO03/016822

PCT Pub. Date: Feb. 27, 2003

(65) Prior Publication Data

US 2004/0210383 A1 Oct. 21, 2004

(30) Foreign Application Priority Data

Aug. 21, 2001 (JP) .................................... 2001-1250338

(51) Int. Cl.⁷ ............................................. G01C 21/30
(52) U.S. Cl. ..................... 701/207; 701/208; 701/210; 701/213; 701/214
(58) Field of Search ............................. 701/23, 24, 25, 701/200, 207, 208, 209, 210, 213, 300, 301; 342/357.06, 357.08, 357.09

(56) References Cited

U.S. PATENT DOCUMENTS

| | | | | | |
|---|---|---|---|---|---|
| 6,370,475 | B1 | * | 4/2002 | Breed et al. ................ | 701/301 |
| 6,542,816 | B1 | * | 4/2003 | Ito et al. ..................... | 701/209 |
| 6,615,135 | B2 | * | 9/2003 | Davies ....................... | 701/213 |
| 6,622,085 | B1 | * | 9/2003 | Amita et al. ................ | 701/208 |
| 6,622,090 | B2 | * | 9/2003 | Lin ............................ | 701/213 |

FOREIGN PATENT DOCUMENTS

| | | |
|---|---|---|
| JP | 1-21442 B2 | 4/1989 |
| JP | 8-292043 A | 11/1996 |
| JP | 10-197268 A | 7/1998 |
| JP | 11-304513 A | 11/1999 |
| JP | 11-344348 A | 12/1999 |

* cited by examiner

Primary Examiner—Richard M. Camby
(74) Attorney, Agent, or Firm—Crowell & Moring LLP

(57) ABSTRACT

A car navigation apparatus includes: a current position detection device that detects a current position of a vehicle; and a control device that detects a plurality of roads as candidates used for map matching based upon road map information containing road data used for navigation of the vehicle and the current position detected by the current position detection device, and execute map matching with a most appropriate road among the plurality of roads, and the control device does not execute map matching when a road among the plurality of roads as the candidates used for the map matching is judged to form a circular crossroad.

10 Claims, 7 Drawing Sheets

CAR NAVIGATION SYSTEM AND CAR NAVIGATION CONTROL METHOD

The disclosure of the following priority application is herein incorporated by reference: Japanese Patent Application No. 2001-250338 filed Aug. 21, 2001

TECHNICAL FIELD

The present invention relates to a car navigation apparatus and a car navigation control method.

BACKGROUND ART

There are car navigation apparatuses in the related art that are equipped with a function of displaying a roadmap of an area around the vehicle position, a function of calculating a recommended route from a start point to a destination, a function of providing route guidance based upon the calculated recommended route and the like. Since such a car navigation apparatus needs to detect the current position of the vehicle (the vehicle position), it includes a current position detection device constituted of, for instance, an azimuth sensor that detects the advancing azimuth of the vehicle, a vehicle speed sensor that detects the vehicle speed, a GPS sensor that detects a GPS signal from a GPS (global positioning system) satellite and the like.

Since there is a specific margin of error in the accuracy of the current position detection device, the car navigation apparatus executes correction by adopting the so-called map matching method of the known art if the vehicle position obtained by the current position detection device is not on a road in the roadmap data, so as to set the vehicle position on a road. Through this correction, the vehicle position is displayed on the roadmap with a high degree of accuracy at all times.

We sometimes find ourselves at a roundabout while driving. A roundabout, which is also called a traffic circle or a rotary, is a circular crossroad at the center of a plurality of radially extending roads. De Gaul Square in Paris is a well-known example of a roundabout. The Arc De Triumph is located at the center of De Gaul Square, and the Arc De Triumph is circled by a circle road on which the traffic can advance along a specific direction. Twelve streets such as the Champs Elysee extends radially from De Gaul Square, i.e., from the circle road. A vehicle which has entered De Gaul Square from one of the twelve streets drives around the square on the circle road and drives out into another radially extending street as desired.

However, when map matching processing is executed while the vehicle is traveling through such a roundabout, the position of the vehicle entering a radial road from the roundabout may be erroneously indicated on an adjacent radial road. In addition, when the map matching processing is executed when the vehicle is entering a street from a small roundabout, its position may be erroneously indicated on the radial road from which the vehicle entered the roundabout.

DISCLOSURE OF THE INVENTION

The present invention provides a car navigation apparatus and a car navigation control method that make it possible to display the correct vehicle position at a circular crossroad such as a roundabout.

A car navigation apparatus according to the present invention comprises: a current position detection device that detects a current position of a vehicle; and a control device that detects a plurality of roads as candidates used for map matching based upon roadmap information containing road data used for navigation of the vehicle and the current position detected by the current position detection device, and execute map matching with a most appropriate road among the plurality of roads, and the control device does not execute map matching when a road among the plurality of roads as the candidates used for the map matching is judged to form a circular crossroad. In this car navigation apparatus, it is preferred that when a road among the plurality of roads as the candidates used for the map matching is judged to form a circular crossroad, the control device sustains a state of free running in which no map matching is executed if the free running state has been ongoing and shifts into the free running state if the free running state has not been ongoing.

A car navigation control method according to the present invention comprises: a first step in which a current position of a vehicle is detected; a second step in which a plurality of roads as candidates used for map matching are detected based upon roadmap information containing road data used for navigation of the vehicle and the current position of the vehicle having been detected; a third step in which a decision is made as to whether or not a road forming a circular crossroad is included in the plurality of roads as the candidates used for the map matching; and a fourth step in which map matching is executed with a most appropriate road among the plurality of roads having been detected when no road among the plurality of roads as the candidates used for the map matching is judged to form a circular crossroad and no map matching is executed when a road among the plurality of roads used as the map matching candidates is judged to form a circular crossroad.

A computer-readable computer program product according to the present invention has a car navigation control program. The control program comprises: a first instruction code for detecting a current position of a vehicle; a second instruction code for detecting a plurality of roads as candidates used for map matching based upon roadmap information containing road data used for navigation of the vehicle and the current position of the vehicle having been detected; a third instruction code for making a decision as to whether or not there is a road forming a circular crossroad among the plurality of roads as the candidates used for the map matching; and a fourth instruction code for executing map matching with a most appropriate road among the plurality of roads having been detected when no road among the plurality of roads as the candidates used for the map matching is judged to form a circular crossroad, and executing no map matching when a road among the plurality of roads as the candidates used for the map matching is judged to form a circular crossroad.

It is preferred that the computer-readable computer program product is a recording medium having recorded therein the control program.

Or it is preferred that the computer-readable computer program product is a carrier wave on which the control program is embodied as a data signal.

BEST MODE FOR CARRYING OUT THE INVENTION

Figure 1:
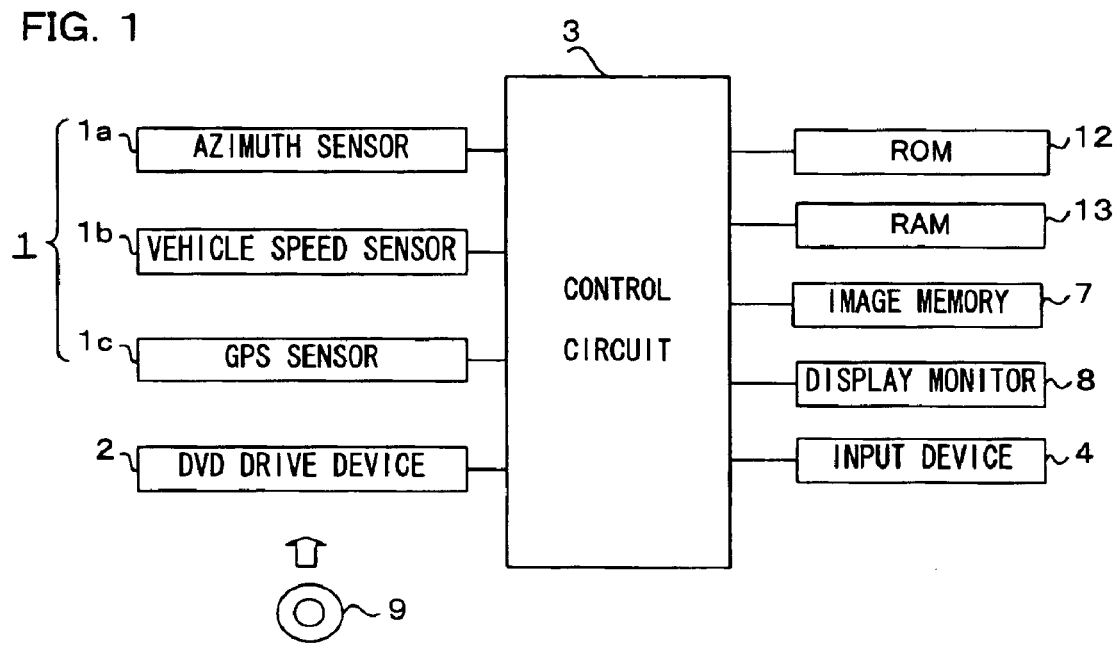
FIG. 1 is a block diagram of the car navigation apparatus achieved in an embodiment of the present invention.

FIG. 1 is a block diagram of the car navigation apparatus achieved in an embodiment of the present invention. Reference numeral 1 in FIG. 1 indicates a current position detection device that detects the point at which the vehicle is currently located (the vehicle position, the current position) and is constituted of, for instance, an azimuth sensor 1a which detects the advancing azimuth of the vehicle, a vehicle speed sensor 1b which detects the vehicle speed, a GPS sensor 1c which detects a GPS signal transmitted from a GPS (global positioning system) satellite and the like.

The azimuth sensor 1a, which is constituted of an oscillating gyro sensor and the like, detects the rotational angular speed when the vehicle turns and outputs a corresponding voltage signal. The vehicle speed sensor 1b may be mounted at, for instance, the transmission output shaft of the vehicle to output a pulse corresponding to the vehicle speed. The combination of the azimuth sensor 1a and the vehicle speed sensor 1b makes it possible to two-dimensionally detect the movement of the vehicle. The GPS sensor 1c obtains the vehicle position by executing a specific arithmetic operation based upon the GPS signal having been received. In the embodiment, there is a margin of error in the range which is expressed as a circle with a radius of approximately 100 m for the vehicle position ascertained by the GPS sensor 1c. It is to be noted that the vehicle position is expressed by using the mesh number assigned to a specific mesh among the meshes into which the map is divided and X Y standardized coordinates which are the coordinate values obtained by further dividing the map mesh.

Reference numeral 2 indicates a DVD drive device at which a DVD 9 constituting a recording medium having recorded therein roadmap data (information) is normally loaded. Reference numeral 3 indicates a control circuit that implements overall control of the apparatus and is constituted with a microprocessor and its peripheral circuits. The control circuit 3 implements overall control for the car navigation apparatus including the control to be detailed later by executing a program stored in a ROM 12. Reference numeral 4 indicates an input device having various switches through which a destination for the vehicle and the like are entered. It also includes a joystick operated to instruct a cursor movement and a screen scroll. It is to be noted that the input device 4 may adopt a remote control system. In addition, touch panel switches may be provided within the screen.

Reference numeral 7 indicates an image memory in which image data to be displayed at a display monitor 8 are stored. The image data are prepared by using roadmap drawing data and various types of graphic data. The image data stored in the image memory 7 are read out as the need arises and are displayed at the display monitor 8.

The car navigation apparatus adopting the structure described above executes various types of navigation operations based upon the vehicle position information obtained by the current position detection device 1 and the roadmap data (information) stored in the DVD 9. For instance, it displays a roadmap of an area around the vehicle position and the vehicle position at the display monitor 8 and guides the driver along a route determined through a route search.

Next, the map matching processing executed in the embodiment is explained. The map matching processing is executed when the vehicle position ascertained by the current position detection device 1 is not located on a road in the roadmap data to calculate several candidate points on roads and move the vehicle position display to the candidate point achieving the highest degree of trustworthiness. While a plurality of map matching candidate points are calculated during the process of map matching in the embodiment, "map matching" simply refers to repositioning the display to the most appropriate point (road) among the candidates.

In addition, in the explanation of the embodiment, the state in which the vehicle position mark is continuously displayed at the position detected by the current position detection device 1 without executing repositioning the display through map matching at the car navigation apparatus having the map matching function is referred to as a free running state. Namely, in the free running state, the vehicle position mark indicating the position of the traveling vehicle is displayed at a point that is not on a road in the roadmap on display.

Figure 2:
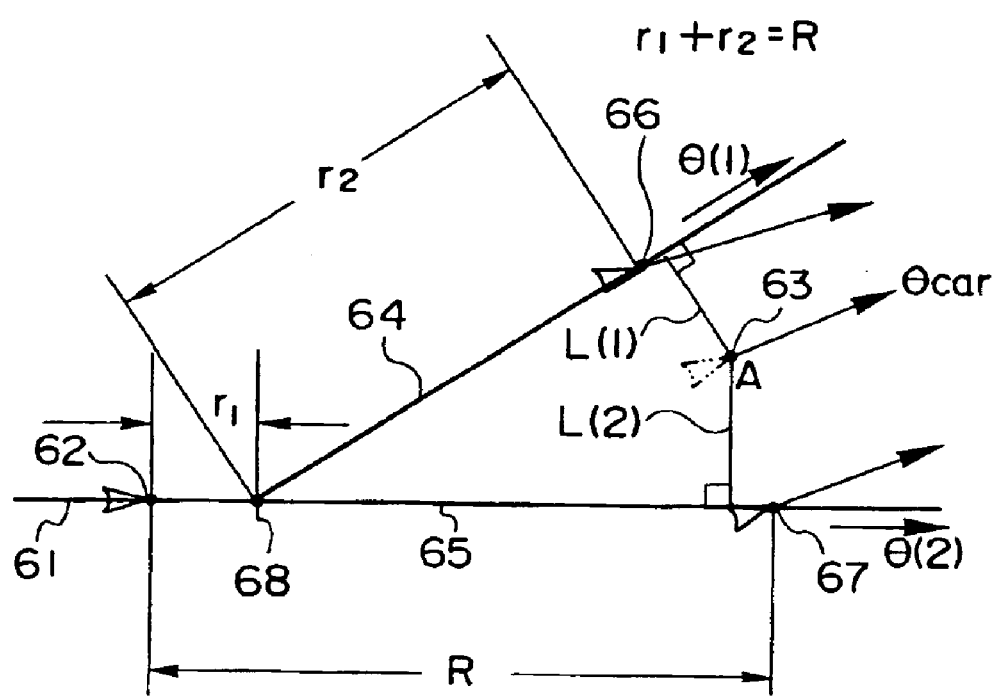
FIG. 2 illustrates how candidate points are calculated in map matching processing.

FIG. 2 illustrates how the candidate points are calculated in the map matching processing. In FIG. 2, roads are indicated by using links and an intersecting point of the roads is indicated as a node. Namely, FIG. 2 shows links 61, 64 and 65 and a node 68. Let us assume that a candidate point 62 present on the link 61 has been calculated through map matching. That is, the vehicle position mark is displayed at the candidate point 62, and the candidate point 62, therefore, is a display candidate. The current position detection device 1 detects the accumulated distance traveled by the vehicle and the azimuth of the vehicle after every 2 m traveled by the vehicle in this state. After the vehicle has traveled 20 m, the next map matching processing is executed. At this point, the current position detection device 1 detects the two-dimensional displacement of the vehicle through traveling 20 m. By adding the displacement of the vehicle detected by the current position detection device 1 to the point 62, a point 63 is obtained as a virtual or temporary current position A relative to the display candidate 62. The operation through which the current position of the vehicle is sequentially ascertained in this manner by utilizing the current position detection device 1 is referred to as dead reckoning. In this operation, the vehicle azimuth θcar, too, is obtained concurrently.

Next, any link connected to the link 61 at which the candidate point 62 is present, with its azimuth manifesting a difference equal to or less than a predetermined value relative to the vehicle azimuth, is extracted. In FIG. 2, the links 64 and 65 are extracted. Then, the distances L (1) and L (2) from the virtual current position A63 to the links 64 and 65 are calculated, and error costs ec(n) are calculated for the two links based upon the calculated distances, angles θ (1) and θ (2) of the links 64 and 65 and the vehicle azimuth θcar by using the following expression (1).

$$ec(n)=\alpha \times |\theta car - \theta(n)| + \beta |L(n)| \qquad (1)$$

In the expression presented above, θcar represents the azimuth of the vehicle at the virtual current position A63, θ(n) represents the azimuth of a given link, L(n) represents the distance from the virtual current position A to the link, i.e., the length of the perpendicular and α and β represent weighting coefficients. The values of these weighting coefficients may be adjusted depending upon which of the two factors, i.e., the offset manifesting between the advancing direction and the azimuth of the road and the offset manifesting between the current position and the road, should carry more weight in the selection of the road on which the current position belongs. For instance, the value of α should be increased when attaching more importance to a road with an azimuth close to the advancing direction.

Next, an accumulated error cost es(n) of the links is calculated for the current processing based upon the corresponding error cost ec(n) having been calculated and the accumulated error cost es having been obtained for the candidate point 62 through the previous processing by using expression (2).

$$es(n)=(1-k)\times es+k\times ec(n) \quad (2)$$

In the expression presented above, k represents a weighting coefficient which is larger than 0 and smaller than 1. The accumulated error cost es(n) indicates the specific extent to which the error cost having been calculated through the previous processing should be reflected in the error cost calculated through the current processing.

Then, based upon the accumulated error cost es(n) thus calculated, a trustworthiness factor trst(n) of the link is calculated by using expression (3).

$$trst(n)=100/(1+es(n)) \quad (3)$$

As the expression above clearly indicates, the trust worthiness factor trst(n) becomes lower and approaches 0 (zero) as the accumulated error cost ec(n) increases. If, on the other hand, the accumulated error cost ec(n) becomes smaller, the trustworthiness factor trst(n) increases and the value approaches 100.

New candidate points are calculated based upon the distance R traveled by the vehicle, which is determined by the current position detection device 1, as positions advanced from the candidate point 62 by a length corresponding to the traveled distance R along the links 61 and 64 and along the links 61 and 65 respectively. In FIG. 2, points 66 and 67 are ascertained as new candidate points relative to the candidate point 62.

In the embodiment, up to seven candidate points can be held. Accordingly, there are six other candidate points, i.e., six other shadow candidates, in addition to the display candidate 62. A similar arithmetic operation is executed for each of these shadow candidates to ascertain new candidate points and their trustworthiness factors are calculated. Then, the top seven candidates achieving the highest trustworthiness factors among them are stored as new candidate points, and the candidate point with the highest trustworthiness factor is assigned as a candidate point to which the display should be set through map matching, i.e., as the display candidate.

It is to be noted that details of the actual map matching processing are not limited to those explained above. Since the map matching processing technology is of the known art, it is understood that the map matching processing as referred to in the explanation of the embodiment maybe any of all types of map matching processing in the known part. In other words, any of various other methods may be adopted instead of that explained above to obtain a plurality of map matching candidates or to select the most appropriate candidate from the plurality of candidates.

Figure 3:
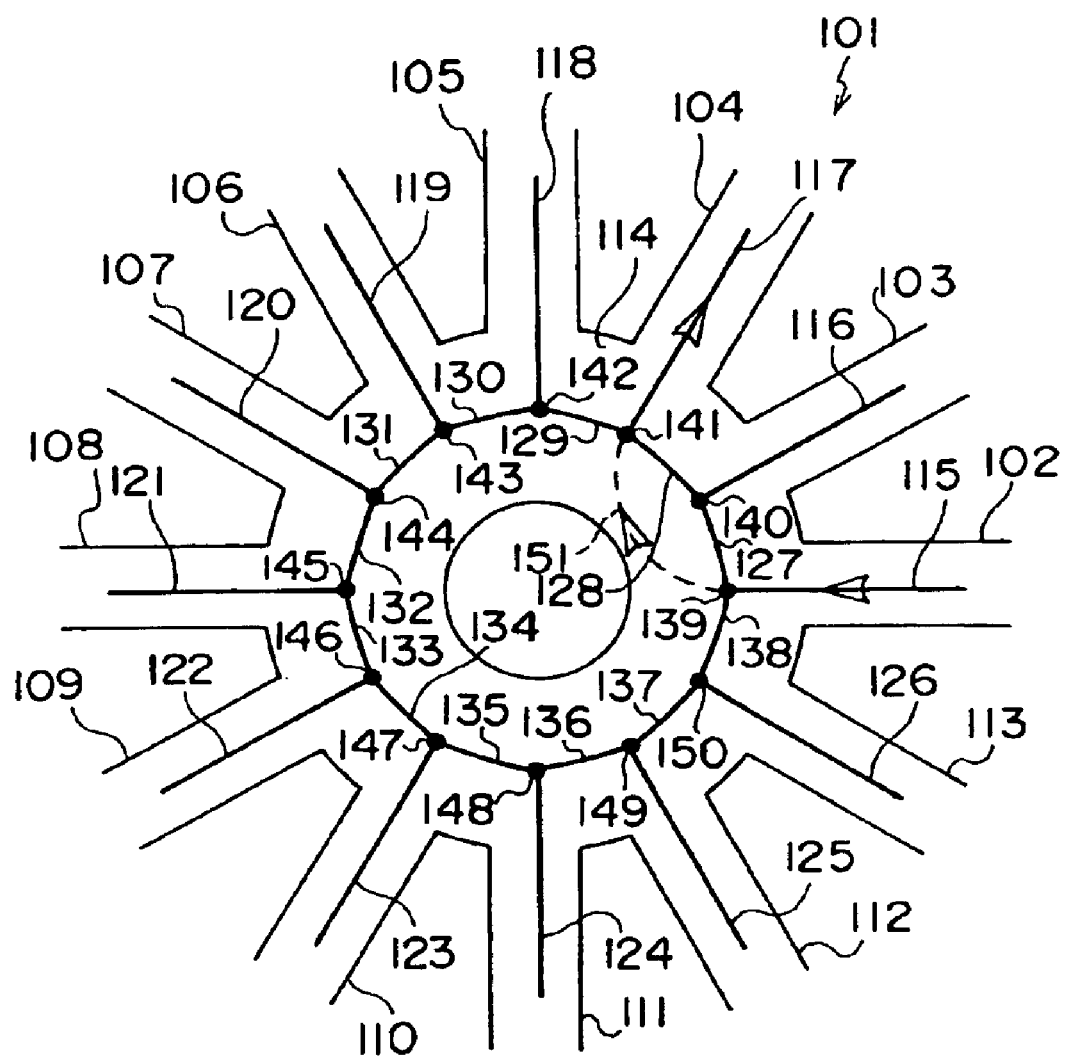
FIG. 3 shows an example of a roundabout.

Next, the roundabout processing achieved in the embodiment is explained. FIG. 3 presents an example of a roundabout 101. At the roundabout 101, twelve roads 102 to 113 extending radially are connected to a circle road 114. The roadmap data contain links 115 to 126 in correspondence to the roads 102 to 113, links 127 to 138 in correspondence to the circle road 114 and nodes 139 to 150 in correspondence to the intersecting points of the roads 102 to 113 and the circle road 114. The links 127 to 138 corresponding to the circle road 114 are each present at an approximate center of the circle road 114, and the nodes 139 to 150 each have coordinates corresponding to the respective positions.

Let us now consider a situation in which the vehicle enters the roundabout 101 from the road 102, circles along the circle road 114 in the counterclockwise direction and exits the roundabout 101 to the road 104. A car navigation apparatus in the related art executes map matching even when the vehicle has entered a roundabout as long as a predetermined condition is satisfied. However, since the circle road 114 often has a large width, the vehicle may travel with a locus indicated by the dotted line 151, and in such a case, an error may occur between the distance data corresponding to the links 127 and 128 and the distance actually traveled by the vehicle. As a result, the position of the vehicle which is actually advancing on the road 104 may be erroneously map-matched onto the adjacent road 105.

This error is attributable to the nature of a roundabout, i.e., where the radial roads 104 and 105 extend in close proximity to each other without their road azimuths manifesting a significant difference. Namely, the trustworthiness factor of a candidate point on the road 105 may be calculated to have a higher value under certain conditions of vehicle behavior. Once the current position of the vehicle having exited the roundabout is map-matched onto the wrong road, the vehicle position will be continuously map-matched on the wrong road until the trustworthiness factor of a candidate point on the correct road becomes higher or until the current vehicle position is ascertained through the GPS sensor 1c or the like.

This problem is addressed in the embodiment by not repositioning the display through map matching (by prohibiting map matching) when the vehicle enters a roundabout. More specifically, when calculating new candidate points relative to the previous display candidate, no map matching is executed if any link undergoing the arithmetic operation is determined to be a link that forms part of a roundabout.

Figure 4:
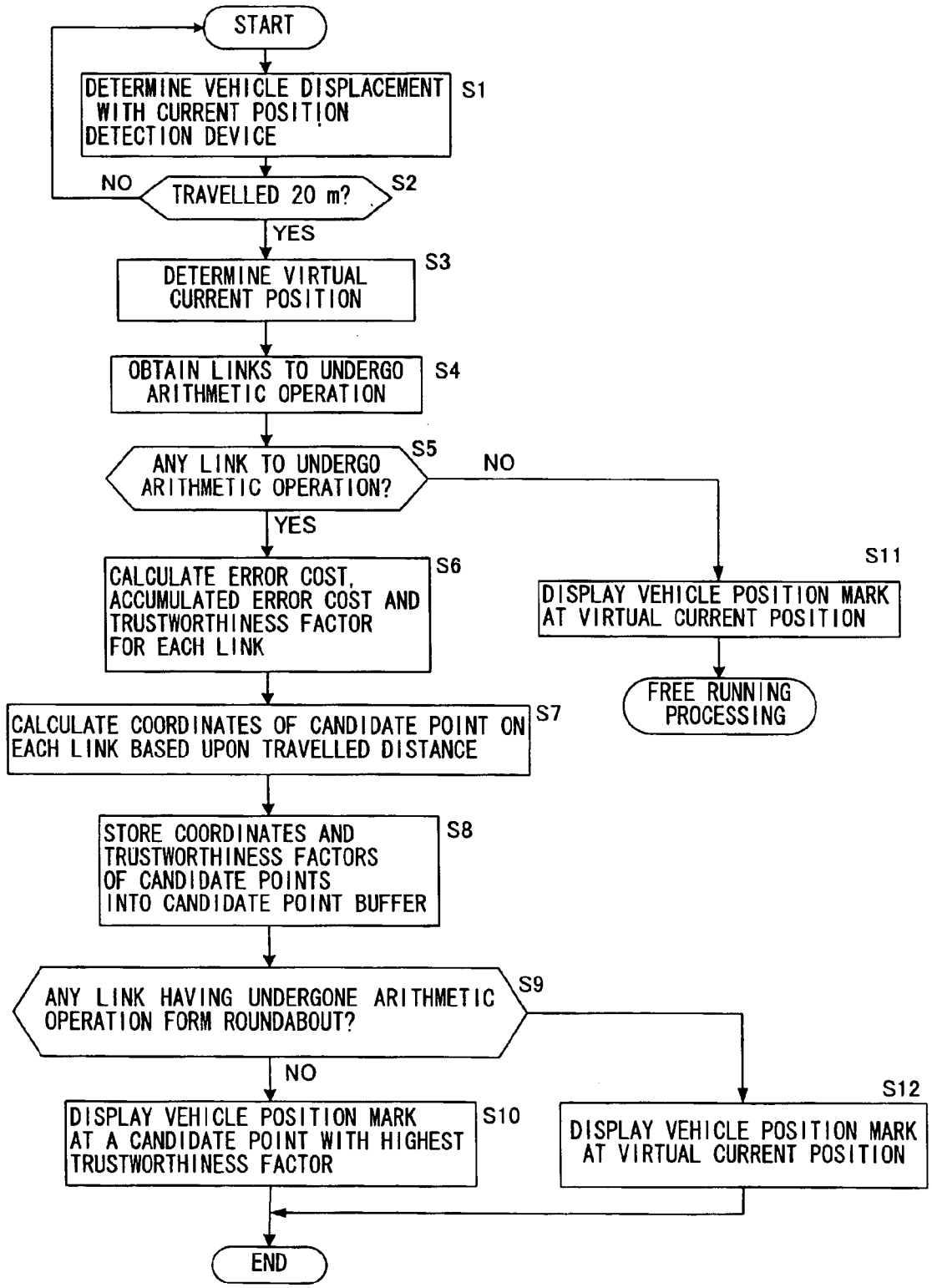
FIG. 4 presents a flowchart of the control implemented for the map matching processing.

FIG. 4 presents a flowchart of the control executed in the map matching processing. The program which enables the processing shown in FIG. 4 is stored in the ROM 12 and is executed by the control circuit 3.

In step S1, the current position of the vehicle is detected and the two-dimensional displacement of the vehicle is ascertained by the current position detection device 1. In step S2, a decision is made as to whether or not the vehicle has traveled 20 m. In the embodiment, the current position detection device 1 detects the current position of the vehicle and the vehicle azimuth after every 2 m traveled by the vehicle and the map matching processing is executed over every 20 m traveled by the vehicle. If it is decided in step S2 that the vehicle has traveled 20 m, the operation proceeds to step S3. In step S3, a virtual current position (the point 63 in FIG. 2) is determined by adding the displacement of the vehicle, which has been determined in step S1, to the previous display candidate point (e.g., the point 62 in FIG. 2).

In step S4, links to undergo the arithmetic operation (the links 64 and 65 in FIG. 2) in order to determine new candidate points relative to the previous display candidate point are ascertained. A link connecting with the link on which the display candidate point has been present, with the difference between its azimuth and the azimuth of the vehicle at the virtual current position achieving an angle equal to or less than a predetermined angle, is selected as a link to undergo the arithmetic operation. Then, any link at which a point reached by traveling along the links by 20 m from the previous candidate point is selected from the links to which a perpendicular can be drawn from the virtual current position.

In step S5, a decision is made as to whether or not any such link to undergo the arithmetic operation has been selected in step S4. If it is decided in step S5 that even one such link exists, the operation proceeds to step S6. In step S6, the error cost, the accumulated error cost and the trustworthiness factor are calculated for each of the links selected in step S4. In addition, in step S7, the coordinates of points (the points 66 and 67 in FIG. 2) reached by advancing over a predetermined traveling distance (20 m in this case) from the display candidate point (the point 62 in FIG. 2) along the individual links are ascertained.

In step S8, the trustworthiness factors and the coordinates of the candidate points (the points 66 and 67 in FIG. 2) determined in steps S6 and S7 are stored into a candidate point buffer. In the embodiment, the candidate point buffer is capable of storing data of up to seven candidate points.

In step S9, a decision is made as to whether or not any of the links having undergone the arithmetic operation executed in step S6 is a link constituting part of a roundabout. Information as to whether or not a given link constitutes part of a roundabout is indicated as a link attribute stored in the roadmap data. In more specific terms, the roadmap data contain node information in correspondence to each node, and as the node information, the coordinates of the node, the link number assigned to any link connected to the node, the attribute of the link and the like are stored. For instance, in the case of the roundabout shown in FIG. 3, the links 127 to 138 are links constituting the roundabout. The individual sets of node information corresponding to the nodes 139 to 150 contain attribute data indicating that the links 127 to 138 respectively connecting with the nodes 139 to 150, which constitute a roundabout.

If it is decided in step S9 that there is no link constituting part of a roundabout among the links having undergone the arithmetic operation, the operation proceeds to step S10. In step S10, standard map matching is executed by selecting the candidate point achieving the highest trustworthiness factor as the new display candidate and displaying the vehicle position mark at the position of the display candidate. If, on the other hand, it is decided in step S9 that there is even one link that constitutes part of a roundabout among the links having undergone the arithmetic operation, the operation proceeds to step S12. In step S12, the vehicle position mark is displayed at the virtual current position. In other words, no repositioning of the display is executed through map matching in step S12 and instead, the vehicle position mark is displayed at the virtual current position ascertained by the current position detection device 1 through the free running processing.

If it is decided in step S5 that no qualifying link to undergo the arithmetic operation has been selected in step S4, the operation proceeds to step S11. In step S11, the vehicle position mark is displayed at the virtual current position and the operation shifts into the free running processing. Conceivable situations in which no qualifying link has been selected in step S4 include, for instance, circumstances under which the azimuths of all the links connected to the link at which the display candidate point is present are 45°, 90°, etc., although the vehicle has been advancing straight ahead. If the difference between the advancing azimuth of the vehicle and the azimuth of a given link is equal to or greater than 35°, the link is excluded from the arithmetic operation, and accordingly, it is decided in the situation described above that there is no link to undergo the arithmetic operation. In other words, it is decided that there is no link to be followed, and the operation enters the free running processing mode.

While an explanation is given above in reference to FIG. 4 on an example in which the trustworthiness factors and the like of new candidate points relative to the previous display candidate are calculated, a similar arithmetic operation is executed in correspondence to each of the shadow candidates as well as for the display candidate. Then, the top seven candidate points with the highest trustworthiness factors are stored into the candidate point buffer. However, the links considered in the decision-making executed in step S9 to determine whether or not there is any link constituting part of a roundabout among the links having undergone the arithmetic operation are the links ascertained in correspondence to the previous display candidate alone. It is to be noted that links considered in this decision-making step may instead be links corresponding to the candidate points stored in the candidate point buffer, or only the links corresponding to a few candidate points with the highest trustworthiness factors may be considered.

As described above, no repositioning of the display is executed through map matching once the vehicle enters a roundabout. As a result, no mismatch attributable to the inherent attribute of a roundabout occurs and the vehicle position is displayed at the correct point.

Figure 5:
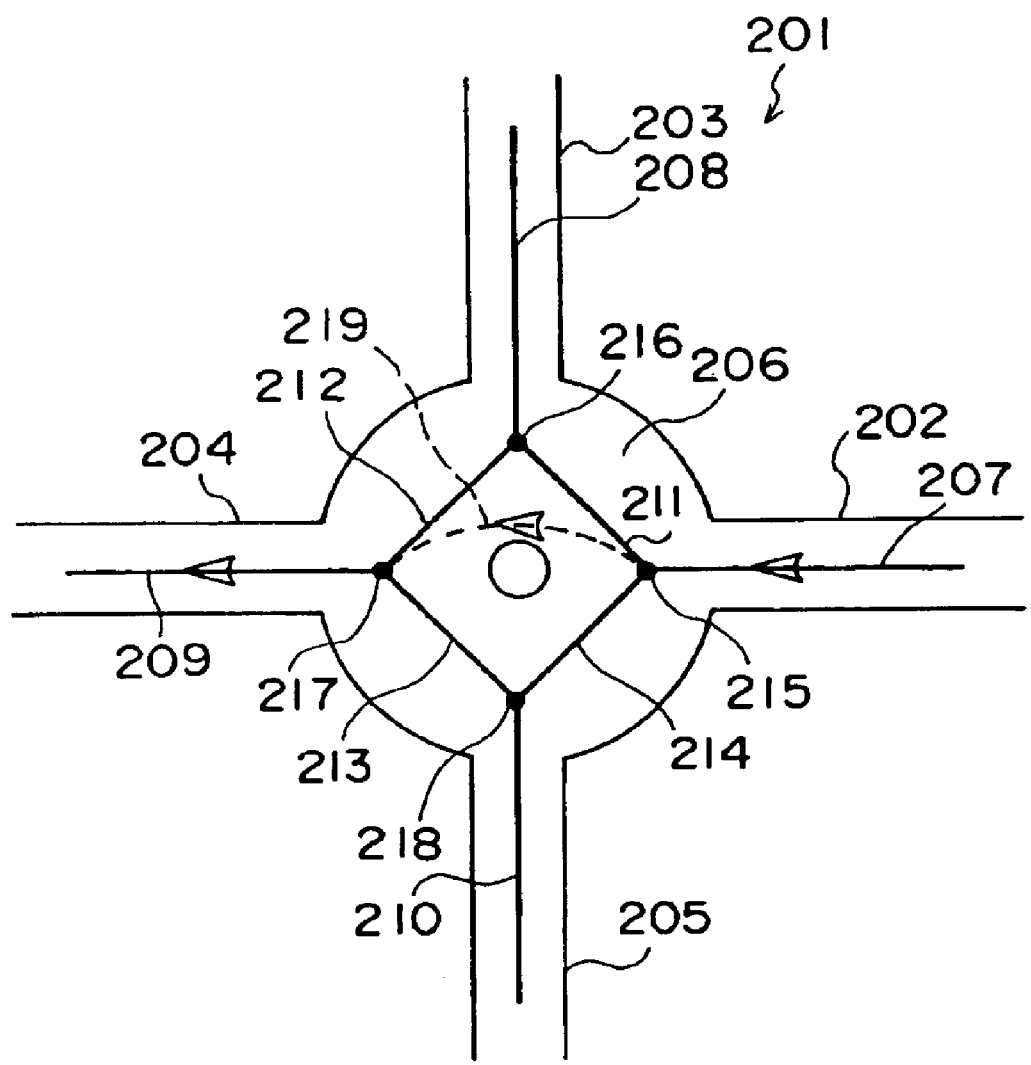
FIG. 5 shows an example of a small-scale roundabout.

Next, an explanation is given on the application of the present invention in conjunction with a small-scale roundabout. FIG. 5 presents an example of a small-scale roundabout 201. At the roundabout 201, four roads 202 to 205 extending radially are connected to a circle road 206. The roadmap data contain links 207 to 210 in correspondence to the roads 202 to 205, links 211 to 214 in correspondence to the circle road 206 and nodes 215 to 218 in correspondence to the intersecting points of the roads 202 to 205 and the circle road 206. The links 211 to 214 corresponding to the circle road 206 are each present an approximate center of the circle road 206, and the nodes 125 to 128 each have coordinates corresponding to the respective positions.

Let us now consider a situation in which the vehicle enters the roundabout 201 from the road 202, circles along the circle road 206 in the counterclockwise direction and exits the roundabout 201 to the road 204. In this situation, the vehicle may travel with a locus indicated by the dotted line 219 at the small-scale roundabout. Such vehicle behavior is detected by the current position detection device 1 as a a substantially linear advancing movement. However, the roadmap data indicate that the link 211 extends at an angle of approximately 45° relative to the link 207. Since the actual advancing azimuth of the vehicle and the azimuth of the link 211 indicated in the road map data differ from each other greatly, none of the links present along the direction in which the links 211, 212 and 209 connect with each other is selected for the candidate point calculation.

Accordingly, it is decided in step S5 in FIG. 4 that there is no qualifying link to undergo the arithmetic operation, and the operation starts the free running processing. Since linear vehicle behavior is indicated in the example explained above, a past candidates point on the link 207 which is situated on the straight line may be judged to have the highest trustworthiness factor in the map matching processing executed in the free running state. Consequently, the vehicle position may be erroneously map-matched to the past candidate point, resulting in a display of the current vehicle position suddenly jumping backward. This problem, too, is solved by executing processing as explained below.

Figure 6:
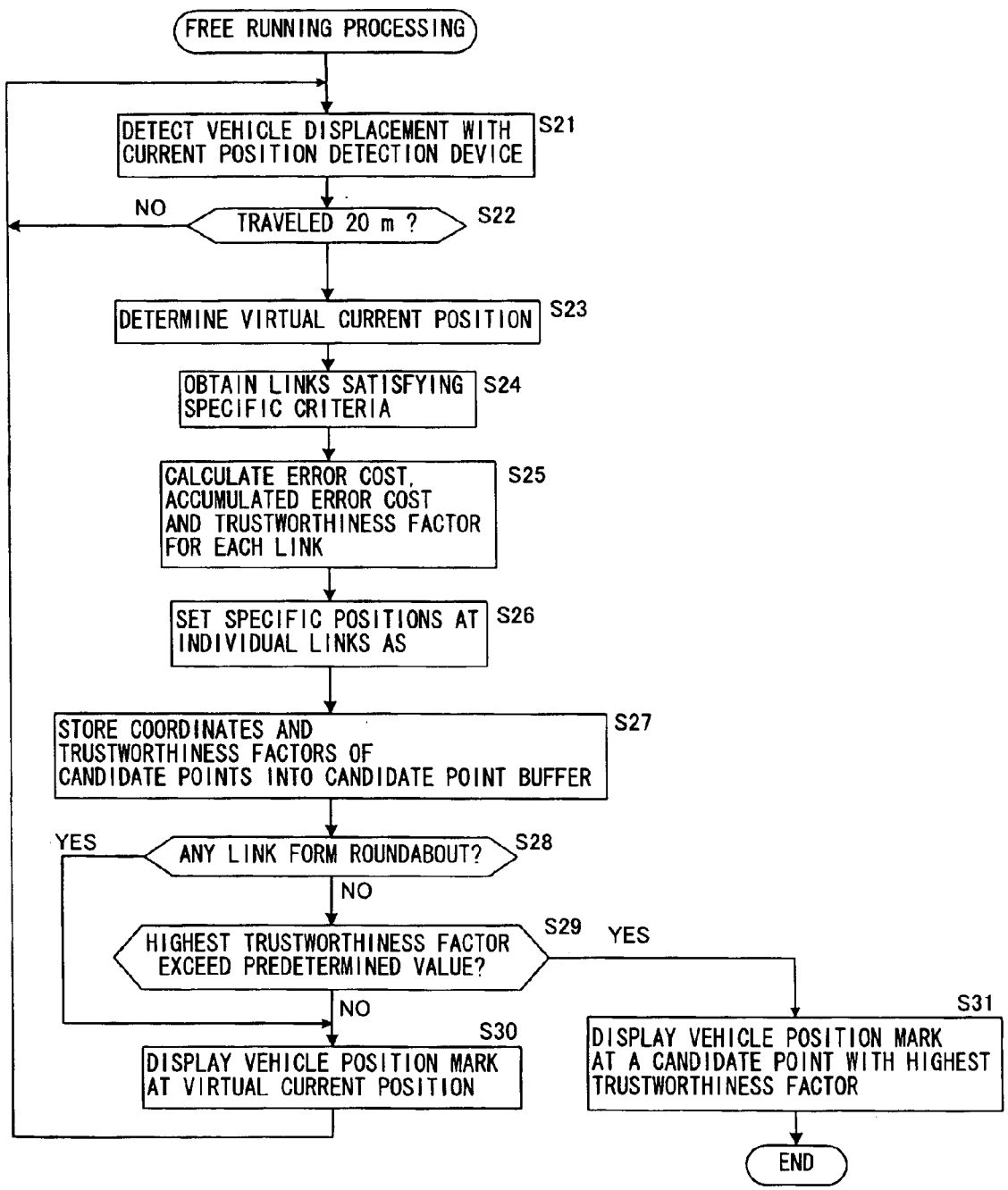
FIG. 6 presents a flowchart of the control implemented for the map matching processing in the free running state.

FIG. 6 presents a flowchart of the map matching processing control executed in the free running state. As in FIG. 4, the current position of the vehicle is detected and the two-dimensional displacement of the vehicle is ascertained by the current position detection device 1 in step S21. In step S22, a decision is made as to whether or not the vehicle has traveled 20 m. If it is decided in step S22 that the vehicle has traveled 20 m, the operation proceeds to step S23. In step S23, a virtual or temporary current position is determined by adding the displacement of the vehicle, which has been determined in step S21, to the previous display candidate point. In the free running state, the previous display candidate point matches the previous virtual current position.

In step S24, any link that satisfies predetermined criteria for map matching is selected. The predetermined criteria may include that the link be present within determined range (e.g., within a 100 m×100 m range) from the new virtual current position with the difference between its azimuth and the azimuth of the vehicle at the virtual current position equal to or smaller than a predetermined angle, or that a perpendicular can be drawn from the virtual current position to the link present within the predetermined range.

In step S25, the error cost, the accumulated error cost and the trustworthiness factor are calculated for each of the links selected in step S24. If the vehicle position has been previously displayed at the previous virtual current position, the accumulated error cost is calculated based upon the error cost of the virtual current position. In step S26, the coordinates of a candidate point set at a specific position in each link are ascertained. The specific position in this case may be set at the intersecting point at which the link and the perpendicular drawn from the virtual current position intersect each other.

In step S27, the trustworthiness factors and the coordinates of the candidate points determined in steps S25 and S26 are stored into the candidate point buffer. As explained earlier, the candidate point buffer is capable of storing data of up to seven candidate points.

In step S28, a decision is made as to whether or not any of the links selected in step S24 constitutes part of a roundabout. The decision as to whether or not a given link constitutes part of a roundabout should be made as in step S9 in FIG. 4. If it is decided in step S28 that none of the links being considered constitute part of a roundabout, the operation proceeds to step S29. In step S29, a decision is made as to whether or not the trustworthiness factor of the candidate point achieving the highest trustworthiness factor exceeds a predetermined value. The decision-making is executed in step S29 as described above, since if the trustworthiness factor of any of the candidate points calculated in the free running state does not achieve a level of trustworthiness high enough for map matching, it is better to display the vehicle position where it is in the free running state without executing display repositioning through map matching.

If it is decided in step S29 that the highest trustworthiness factor does not exceed the predetermined level, the operation proceeds to step S30. In step S30, the vehicle position mark is displayed at the virtual current position. Namely, the free running display is sustained instead of executing map matching. If, on the other hand, it is decided in step S29 that the highest trustworthiness factor exceeds the predetermined value, the operation proceeds to step S31. In step S31, the vehicle position mark is displayed at the candidate point with the highest map matching trustworthiness factor. Namely, a road satisfying the map matching criteria has been found and, accordingly, the vehicle position is map-matched to this road.

If it is decided in step S28 that the links being considered include a link constituting part of a roundabout, the operation proceeds to step S30. In step S30, the vehicle position mark is displayed at the virtual current position. Namely, if a link that may be used for map matching purposes is determined to constitute part of a roundabout in the free running state, repositioning through map matching is not executed and instead, free running display is sustained. In other words, the operation enters a map matching prohibit mode.

Thus, the vehicle position can be displayed at the appropriate position even when the vehicle actually travels almost straight through a roundabout which is indicated in the roadmap data as manifesting a significant angle formed by a road (link) leading to the roundabout and a road (link) constituting the roundabout.

It is to be noted that when no link constituting part of the roundabout is detected among the map matching candidate links any longer in the free running state after the vehicle enters the roundabout, the map matching prohibit mode mentioned earlier is cleared. Namely, the operation proceeds from step S28 to step S29. At this time, the vehicle position may be map-matched to a past candidate point present on the straight line representing the locus of the vehicle, and the current vehicle position display may suddenly jump backward, as discussed earlier. For this reason, appropriate preventive measures should be taken immediately after the vehicle exits a roundabout by, for instance, disallowing map matching to any candidate point located rearward within a specific angular range relative to the advancing azimuth of the vehicle, multiplying the trustworthiness factors of the candidate points located rearward with a predetermined coefficient to lower the trustworthiness factors or excluding a candidate point on any link to which a perpendicular cannot be drawn from the virtual current position.

An explanation has been given in reference to the embodiment on an example in which the present invention is adopted in roundabouts. The term "roundabout" is used to refer to a circular crossroad. Namely, a roundabout is created by forming a circle road at a position at which a plurality of radial roads converge so that a vehicle is allowed to travel from one of the plurality of radial roads into another radial road via the circle road. The present invention may be adopted in all types of roads formed in this manner. For instance, a traffic circle at a train station fits the description of a circular crossroad. In addition, there may be parking lots and parking areas with traffic flows fitting the description of a roundabout.

It is to be noted that "circling" in this context does not necessarily refer to driving around with a circular locus, and it includes a situation in which the vehicle is traveling on a road formed in a polygonal shape such as a quadrangle or a pentagon. Accordingly, the use of the term "circular crossroad" is not limited to a strictly circular circle road and the term may also be used to refer to a road with closed connection. In road map data, a roundabout or a circular crossroad is any road constituted of links forming a closed connection so as to form a polygon.

While an explanation is given above in reference to the embodiment on an example in which the control program executed by the control circuit 3 of the car navigation apparatus is stored in the ROM 12, the present invention is not limited to this example. The control program and the installation program may be provided in a recording medium constituted with the DVD 9. It is to be noted that the recording medium does not need to be a DVD, and any of various other types of recording media such as a CD ROM and magnetic tape may be used instead.

Figure 7:
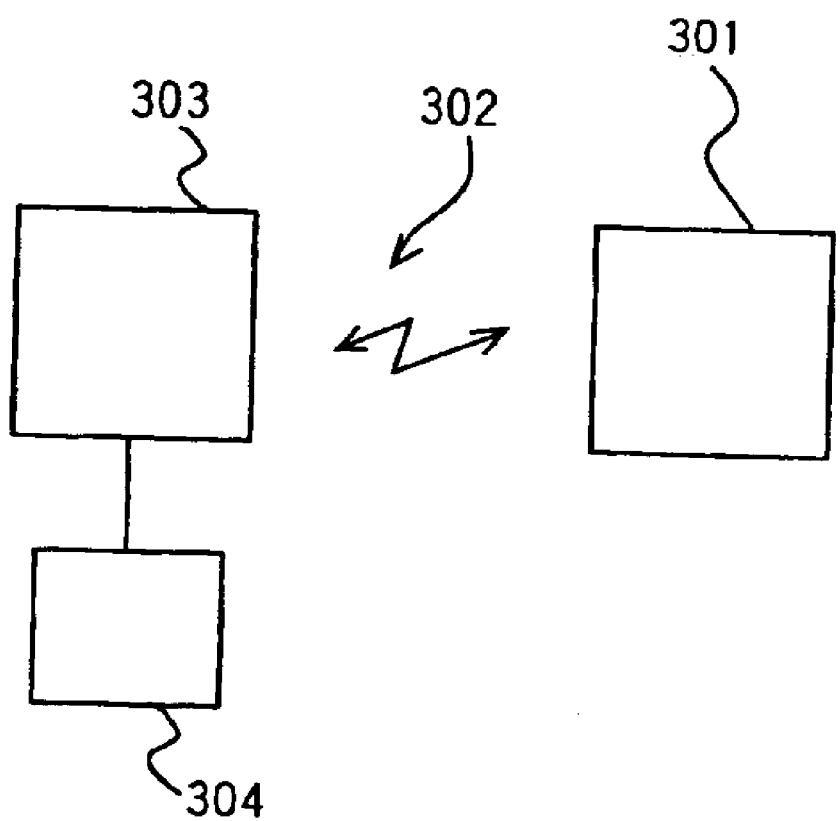
FIG. 7 shows how the program may be provided via a communication line.

Furthermore, these programs may be provided on a carrier wave via a transmission medium such as a communication line, a typical example of which is the Internet. FIG. 7 shows how this may be achieved. A car navigation apparatus 301 is the car navigation apparatus explained earlier and is capable of connecting with a communication line 302. A computer 303 is a server computer that provides the control program for the car navigation apparatus 301, which is stored in a recording medium such as a hard disk 304. The communication line 302 may be a communication line for Internet communication, personal computer communication or the like, or it may be a dedicated communication line. The communication line 302 may be a telephone line or a wireless telephone line for a portable telephone or the like. Thus, the program can be distributed as a computer-readable computer program product adopting any of various modes including a recording medium and a carrier wave.

It is to be noted that the functions of the car navigation apparatus may be realized by executing the control program on a personal computer. In such a case, the current position detection device 1 and the like should be connected to specific I/O ports or the like at the personal computer.

What is claimed is:

1. A car navigation apparatus comprising:
    a current position detection device that detects a current position of a vehicle; and
    a control device that detects a plurality of roads as candidates used for map matching based upon roadmap information containing road data used for navigation of the vehicle and the current position detected by the current position detection device, and execute the map matching with a most appropriate road among the plurality of roads, the map matching being executed for a current position display of the vehicle, wherein:
    the control device makes a decision as to whether or not a road among the plurality of roads as the candidates used for the map matching forms a circular crossroad and does not execute the map matching when a road among the plurality of roads used as the candidates used for the map matching is judged to form a circular crossroad.

2. A car navigation apparatus according to claim 1, wherein:
    when a road among the plurality of roads as the candidates used for the map matching is judged to form a circular crossroad, the control device sustains a state of free running in which no map matching is executed if the free running state has been ongoing and shifts into the free running state if the free running state has not been ongoing.

3. A car navigation control method comprising:
    a first step in which a current position of a vehicle is detected;
    a second step in which a plurality of roads as candidates used for map matching are detected based upon roadmap information containing road data used for navigation of the vehicle and the current position of the vehicle having been detected, the map matching being executed for a current position display of the vehicle;
    a third step in which a decision is made as to whether or not a road forming a circular crossroad is included in the plurality of roads as the candidates used for the map matching; and
    a fourth step in which map matching is executed with a most appropriate road among the plurality of roads having been detected when no road among the plurality of roads as the candidates used for the map matching is judged to form a circular crossroad and no map matching is executed when a road among the plurality of roads as the candidates used for the map matching is judged to form a circular crossroad.

4. A computer-readable computer program product having a car navigation control program, the control program comprising:
    a first instruction code for detecting a current position of a vehicle;
    a second instruction code for detecting a plurality of roads as candidates used for map matching based upon roadmap information containing road data used for navigation of the vehicle and the current position of the vehicle having been detected, the map matching being executed for a current position display of the vehicle;
    a third instruction code for making a decision as to whether or not there is a road forming a circular crossroad among the plurality of roads as the candidates used for the map matching; and
    a fourth instruction code for executing the map matching with a most appropriate road among the plurality of roads having been detected when no road among the plurality of roads as the candidates used for the map matching is judged to form a circular crossroad, and executing no map matching when a road among the plurality of roads as the candidates used for the map matching is judged to form a circular crossroad.

5. A computer-readable computer program product according to claim 4, wherein the computer-readable computer program product is a recording medium having recorded therein the control program.

6. A computer-readable computer program product according to claim 4, wherein the computer-readable computer program product is a carrier wave on which the control program is embodied as a data signal.

7. A car navigation apparatus according to claim 1, wherein:
    when a given road forms a circular crossroad, data indicating that a road forms a circular crossroad are included in the road data; and
    the control device makes a decision as to whether or not a road among the plurality of roads as the candidates used for the map matching forms a circular crossroad by judging whether or not any of the road data corresponding to the plurality of roads as the candidates used for the map matching include data indicating that a road forms a circular crossroad.

8. A car navigation apparatus according to claim 1, wherein:
    the circular crossroad is a roundabout.

9. A car navigation method according to claim 3, wherein:
    when a given road forms a circular crossroad, data indicating that a road forms a circular crossroad are included in the road data; and
    a decision as to whether or not a road among the plurality of roads used as the map matching candidates forms a circular crossroad is made in the third step by judging whether or not any of the road data corresponding to the plurality of roads as the candidates used for the map matching include data indicating that the road forms a circular crossroad.

10. A car navigation method according to claim 3, wherein:
    the circular crossroad is a roundabout.

* * * * *

UNITED STATES PATENT AND TRADEMARK OFFICE
CERTIFICATE OF CORRECTION

PATENT NO. : 6,937,935 B2  Page 1 of 1
DATED : August 30, 2005
INVENTOR(S) : Hiroyuki Sato It is certified that error appears in the above-identified patent and that said Letters Patent is hereby corrected as shown below:

<u>Title page,</u>
Item [22], should read -- [22]    PCT Filed:    August 16, 2002 --.

Signed and Sealed this

Fifteenth Day of November, 2005

JON W. DUDAS
*Director of the United States Patent and Trademark Office*

UNITED STATES PATENT AND TRADEMARK OFFICE
CERTIFICATE OF CORRECTION

PATENT NO. : 6,937,935 B2
DATED : August 30, 2005
INVENTOR(S) : Hiroyuki Sato

It is certified that error appears in the above-identified patent and that said Letters Patent is hereby corrected as shown below:

Title page,
Item [30], Foreign Application Priority Data, should read:
-- (JP)   2001-250338 --.

Signed and Sealed this

Thirteenth Day of December, 2005

JON W. DUDAS
*Director of the United States Patent and Trademark Office*